United States Patent
Dong et al.

(10) Patent No.: US 10,552,746 B2
(45) Date of Patent: Feb. 4, 2020

(54) IDENTIFICATION OF TIME LAGGED INDICATORS FOR EVENTS WITH A WINDOW PERIOD

(71) Applicant: International Business Machines Corporation, Armonk, NY (US)

(72) Inventors: Wei Shan Dong, Beijing (CN); Li Li, Beijing (CN); Xuan Liu, Yorktown Heights, NY (US); Chun Yang Ma, Beijing (CN); Songhua Xing, Staten Island, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1110 days.

(21) Appl. No.: 14/496,002

(22) Filed: Sep. 25, 2014

(65) Prior Publication Data

US 2016/0092770 A1    Mar. 31, 2016

(51) Int. Cl.
*G06N 5/04* (2006.01)

(52) U.S. Cl.
CPC ................................. *G06N 5/04* (2013.01)

(58) Field of Classification Search
CPC ........................................................ G06N 5/04
See application file for complete search history.

(56) References Cited

U.S. PATENT DOCUMENTS

| 4,379,239 | A | 4/1983 | Knuefelmann et al. |
| 5,537,855 | A | 7/1996 | Hunninghaus et al. |
| 7,277,748 | B2 | 10/2007 | Wingeier et al. |
| 8,073,729 | B2 | 12/2011 | Kisin et al. |
| 8,131,472 | B2 | 3/2012 | Chow et al. |
| 8,255,346 | B2 | 8/2012 | Abe et al. |
| 9,113,345 | B2 | 8/2015 | Griff et al. |
| 9,177,259 | B1 | 11/2015 | Levchuk |
| 2006/0167704 | A1 | 7/2006 | Nicholls et al. |
| 2007/0294284 | A1 | 12/2007 | Evans |

(Continued)

FOREIGN PATENT DOCUMENTS

| CN | 103996077 A | 8/2014 |
| JP | 201176409 A | 4/2011 |
| JP | 2013130946 A | 7/2013 |

OTHER PUBLICATIONS

Bothos, Efthimios, Dimitris Apostolou, and Gregoris Mentzas. "Using social media to predict future events with agent-based markets." (2010).*

(Continued)

*Primary Examiner* — Scott A. Waldron
*Assistant Examiner* — Kevin W Figueroa
(74) *Attorney, Agent, or Firm* — Cantor Colburn LLP; Anthony Curro

(57) ABSTRACT

A method and system to identify a time lagged indicator of an event to be predicted are described. The method includes receiving information including an indication of a factor, the factor being a different event than the event to be predicted, and identifying a window period within which the event is statistically correlated with the factor. The method also includes collecting data for a duration of the window period, the data indicating occurrences of the factor and the event, and identifying a time lagged dependency of the event on the factor based on analyzing the data.

18 Claims, 7 Drawing Sheets

(56) References Cited

U.S. PATENT DOCUMENTS

| | | | |
|---|---|---|---|
| 2010/0063715 A1 | 3/2010 | Wynter et al. | |
| 2010/0262027 A1* | 10/2010 | Ebert | G06F 19/3418 600/509 |
| 2011/0119221 A1 | 5/2011 | Mishra et al. | |
| 2011/0153419 A1 | 6/2011 | Hall, III | |
| 2012/0284280 A1 | 11/2012 | Kumar | |
| 2013/0116991 A1 | 5/2013 | Hido | |
| 2013/0138577 A1* | 5/2013 | Sisk | G06Q 30/02 705/36 R |
| 2013/0325787 A1 | 12/2013 | Gerken et al. | |
| 2014/0025998 A1 | 1/2014 | Schimmelpfeng et al. | |
| 2014/0122483 A1* | 5/2014 | Zhang | G06Q 10/10 707/737 |
| 2014/0180722 A1 | 6/2014 | Lynn et al. | |
| 2014/0221848 A1 | 8/2014 | Nagasaka | |
| 2014/0279786 A1 | 9/2014 | Grokop et al. | |
| 2014/0296724 A1* | 10/2014 | Guttag | A61B 5/02405 600/509 |
| 2015/0347918 A1 | 12/2015 | Lucey et al. | |
| 2016/0034323 A1 | 2/2016 | Hampapur et al. | |
| 2016/0034824 A1 | 2/2016 | Dong et al. | |
| 2016/0092770 A1 | 3/2016 | Dong et al. | |

OTHER PUBLICATIONS

Cortez, Paulo, "Sensitivity Analysis for Time Lag Selection to Forecast Seasonal Time Series using Neural Networks and Support Vector Machines", The 2010 International Joint Conference on Neural Networks (IJCNN), Jul. 18-23, 2010, pp. 1-8.

Gainaru et al., "Adaptive Event Prediction Strategy with Dynamic Time Window for Large-Scale HPC Systems", SLAMI '11 Managing Large-Scale Systems via the Analysis of System Logs and Application of Machine Learning Techniques, Oct. 23, 2011, pp. 1-8.

Harms et al., "Discovering Sequential Association Rules with Constraints and Time Lags in Multiple Sequences", ISMIS '02 Proceedings of the 13th International Symposium on Foundations of Intelligent Systems, 2002, pp. 432-441.

List of IBM Patents or Patent Applications Treated as Related; (Appendix P), Filed Sep. 25, 2014; 2 pages.

Arun Hampapur et al., "Characterizing Relationships Among Spatio-Temporal Events", U.S. Appl. No. 14/450,792, filed Aug. 4, 2014.

Wei Shan Dong et al., "Auto-Analyzing Spatial Relationships in Multi-Scale Spatial Datasets for Spatio-Temporal Prediction", U.S. Appl. No. 14/450,712, filed Aug. 4, 2014.

International Search Report and Written Opinion for PCT Application No. PCT/IB2015/056194, dated Dec. 25, 2015, pp. 1-9.

ArcGIS Desktop 9.2, "Functionality Matrix", ESRI, 2006, pp. 1-3.

Bogorny et al., "Spatial and Spatio-Temporal Data Mining", IEEE International Conference on Data Mining, 2010, 1 page.

Gabriel et al., "Second-order analysis of inhomogeneous spatio-temporal point process data", Statistica Neerlandica, vol. 63, No. 1, 2009, pp. 43-51.

IBM, "IBM Crime Information Warehouse—Unlocking data to tight crime", IBM Information Management Software, 2005, pp. 1-2.

IBM, "Public safety: from "sense and respond" to "predict and act"", IBM Software Business Analytics, 2010, pp. 1-8.

Luo et al., "Spatio-temporal Grager causality: A new framework", NeuroImage, vol. 79, 2013, pp. 241-263.

Lynch et al., "A spatiotemporal Ripley's K-function to analyze interactions between space budworm and fire in British Columbia, Canada", Can. J. For. Res., vol. 38, 2008, pp. 3112-3119.

Marcon et al., "A Statistical Test for Ripley's K Function Rejection of Poisson Null Hypothesis", ISRM Ecology, 2013, pp. 1-10.

McGuire et al., "Spatiotemportal neighborhood discovery for sensor data", Springer Berlin Heidelberg, 2010, pp. 203-225.

Mohan et al., "Cascading Spatio-Temporal Pattern Discovery", IEEE Transactions on Knowledge and Data Engineering, vol. 24, No. 11, Nov. 2012, pp. 1-16.

Parthasarathy, S. "Directed Acyclic Graphs and Topological Ordering", 2005 [retrieved from www.cs.umd.edu/class/sum2005/cmsc451/], retrieved Jan. 23, 2017, pp. 1-12.

Ripley, B.D., "The Second-Order Analysis of Stationary Point Processes", J. Appl. Prob. vol. 13, 1976, pp. 255-266.

Shekhar et al., "Spatial and Spatiotemporal Data Mining: Recent Advances", IEEE International Conference on Data Mining, 2010, pp. 1-34.

\* cited by examiner

IDENTIFICATION OF TIME LAGGED INDICATORS FOR EVENTS WITH A WINDOW PERIOD

BACKGROUND

The present invention relates to event prediction, and more specifically, to the identification of time lagged indicators for events with a window period.

Event prediction is an application of data analytics that is directed to predicting a future event based on analysis of historical and other data. Typically, events that occur frequently and at regular intervals are easier to predict than those that occur infrequently and irregularly. This is because traditional association rule mining using temporal patterns are unlikely to predict such irregular events.

SUMMARY

According to one embodiment of the present invention, a method of identifying a time lagged indicator of an event to be predicted includes receiving information including an indication of a factor, the factor being a different event than the event to be predicted; identifying, using a processor, a window period within which the event is statistically correlated with the factor; collecting data for a duration of the window period, the data indicating occurrences of the factor and the event; and identifying a time lagged dependency of the event on the factor based on analyzing the data.

According to another embodiment, a system to identify a time lagged indicator of an event to be predicted includes an input interface configured to receive information including an indication of a factor, the factor being a different event than the event to be predicted; and a processor configured to identify a window period within which the event is statistically correlated with the factor, collect data for a duration of the window period, the data indicating occurrences of the factor and the event, and identify a time lagged dependency of the event on the factor based on analysis of the data.

According to yet another embodiment, a computer program product comprises instructions that, when processed by a processor, cause the processor to implement a method of identifying a time lagged indicator of an event to be predicted. The method includes receiving information including an indication of a factor, the factor being a different event than the event to be predicted; identifying a window period within which the event is statistically correlated with the factor; collecting data for a duration of the window period, the data indicating occurrences of the factor and the event; and identifying a time lagged dependency of the event on the factor based on analyzing the data.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As noted above, infrequent and irregular events may be difficult to predict. These events are random and have no apparent temporal patterns. In addition, their occurrence is associated with uncertainties and is often conditioned on other factors. Thus, traditional association rule mining or relevance analysis that may look for co-occurrence type relationships may be limited in the prediction of infrequent and irregular events. These events are highly dependent on two types of patterns, information about which may be previously known. One type of pattern is timing. For example, a container of butter may expire within a month of purchase and thereby aid in the prediction of when another container of butter will be purchased. The other type of pattern is additional factors that are relevant to the event to be predicted. For example, car theft may be a factor that is relevant to the prediction of a burglary because a stolen car is often used in the commission of a burglary. If only co-occurrence or temporal coincidence is used to establish connections, factors may be associated with events when they are, in fact, unrelated. On the other hand, factors may not be identified even though they do affect the prediction of an event. The inventors have found that the statistical connections between factors and events are accurately identified (while mitigating false correlations) within a window period. Embodiments of the system and method detailed herein relate to identifying the relevant window period and using the window period to identify a time lagged indicator for use in the prediction of an event. That is, embodiments detail the development of an event prediction formula based on a time lag from a factor, which is an event other than the event of interest that correlates with the event of interest.

Figure 1:
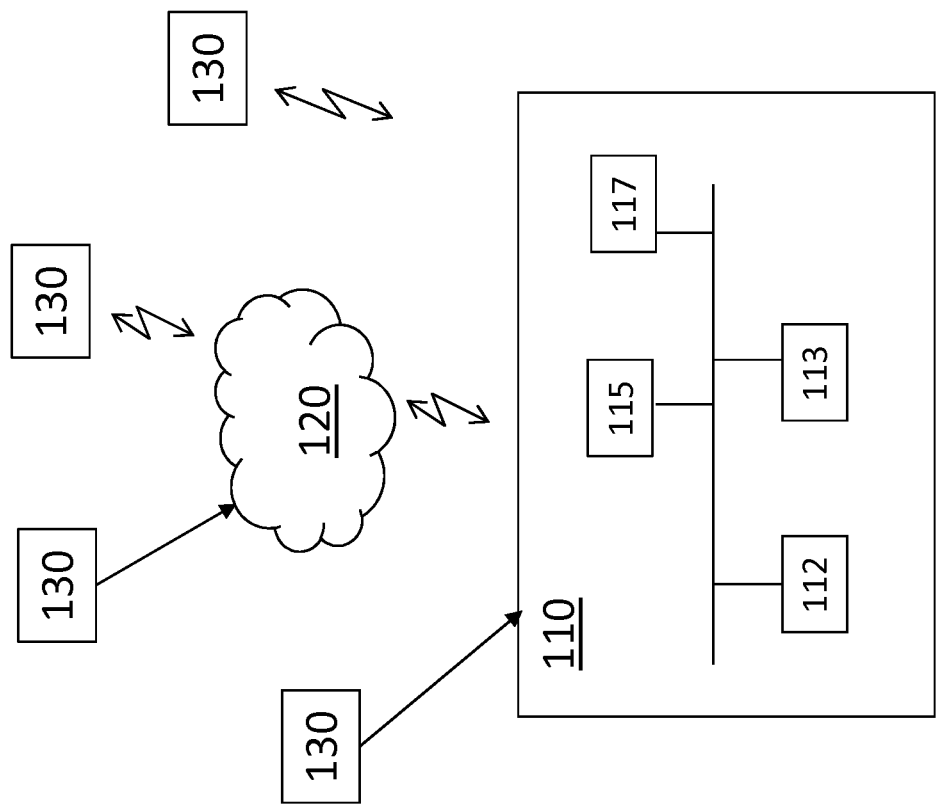
FIG. 1 is a block diagram of a system to perform event prediction based on identification of time-lagged indicators according to embodiments of the invention.

FIG. 1 is a block diagram of a system 110 to perform event prediction based on identification of time-lagged indicators according to embodiments of the invention. The system 110 includes an input interface 112 to receive information from sources 130. The information may be received wirelessly or may be received through a network 120. The information may include prior knowledge, survey information, or expert knowledge, historical event information, or relevant factor information. The information indicates or may be used to identify factors of interest. As detailed below, some or all of the information is used to identify the window period 101 within which statistical correlation between the event 102 and the factor(s) 103 of interest is identifiable.

Some or all of the information is then used to identify the time lagged indicator (the rule that applies to the factor) to predict the event 102. That is, according to one embodiment, the window period 101 and time lagged indicator may be determined for a (known) factor 103 that is identified as a factor 103 in the received information. According to another embodiment, two or more (potential) factors 103 may be tried by determining a window period 101 and determining which of the candidate factors 103 correlates most closely with the event. Both embodiments are further discussed below. Some or all of the data may be stored in one or more memory devices 113 of the system 110 to be used in processing by the one or more processors 115. The processor 115 may identify a window period 101 such that sampled data is collected and stored during the window period 101 in the memory device 113. The time-lagged dependency is also identified by the processor 115 such that a knowledge base is built in the memory device 113, which may also maintain a database of real-time events 102 and real-time relevant factors 103. An output interface 117 facilitates output of data including the window period 101 and time-lagged indicator information (event prediction rule) for further processing or facilitates output of the event prediction information based on processing by the processor 115. The output may be to an operator through a display or transmission wirelessly or through a network to another system. The components (112, 113, 115, 117) of the system 110 may share data through a common bus or may be otherwise interconnected.

Figure 2:
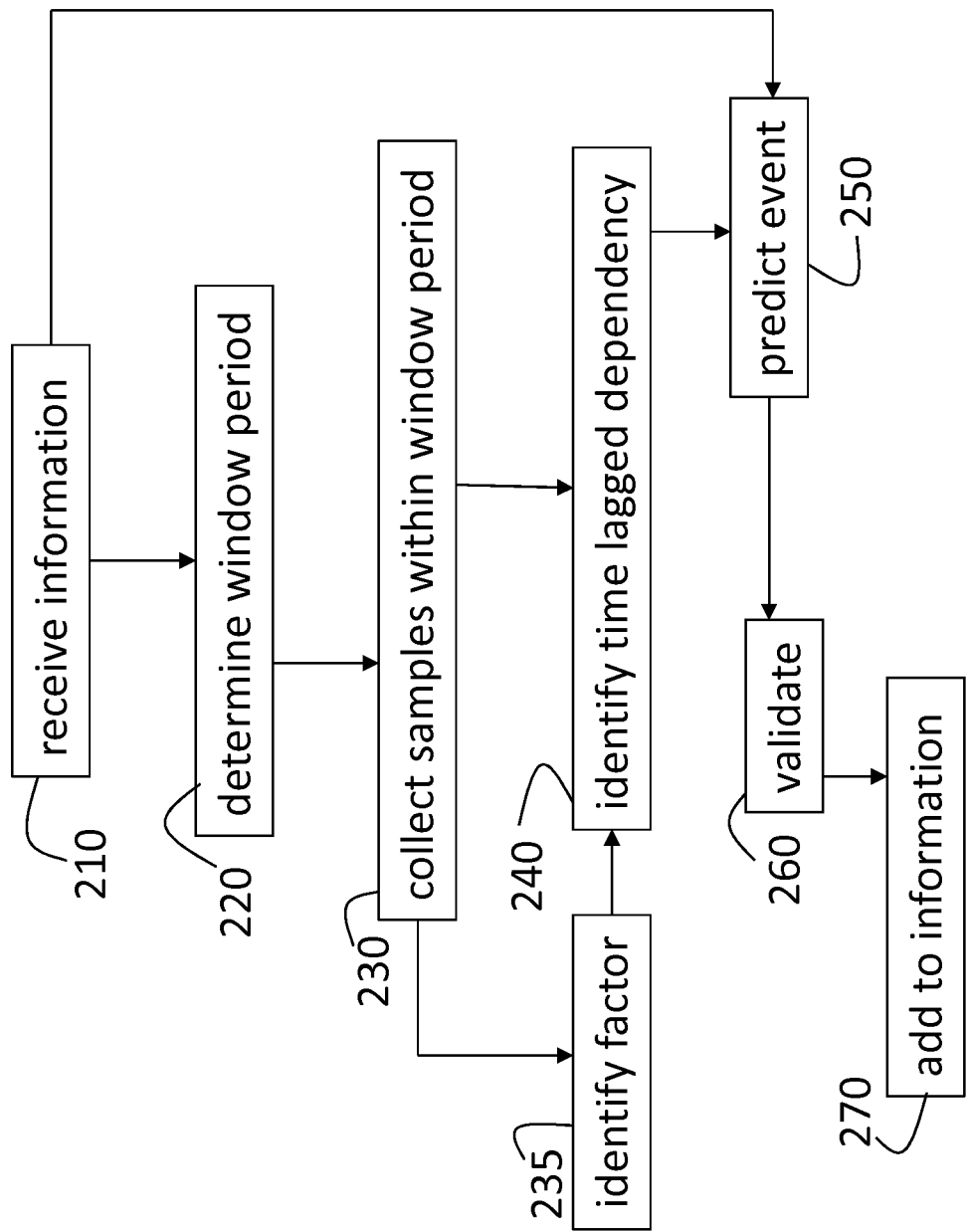
FIG. 2 is a process flow of a method of identifying a time lagged indicator for an event based on identifying and using a window period according to embodiments of the invention.

FIG. 2 is a process flow of a method of identifying a time lagged indicator for an event 102 based on identifying and using a window period 101 according to embodiments of the invention. At block 210, receiving information includes any or all of prior knowledge, survey information, or expert knowledge, historical event information, or relevant factor information. The prior knowledge includes information regarding the event 102 and information regarding one or more potential factors 103. Survey information and expert knowledge may aid in selecting candidate factors 103, for example. Historical event information and relevant factor information is used in determining the window period 101, as detailed below. The information received at block 210 may additionally include the current or real-time information needed to make a prediction (at block 250). As noted above, the received information (block 210) may pertain to one of two embodiments.

According to one embodiment, the information identifies a factor 103 based on prior knowledge, a survey, expert knowledge, or other information received from the sources 130. According to this embodiment, determining the window period 101, at block 220, as detailed below, is for the (known) factor 103. Once the window period is determined, collecting samples of the factor 103 and event 102 within the window period 101, at block 230, facilitates analysis (the processing at block 235 is not performed). This analysis facilitates identifying the time lagged dependency of the event 102 on the factor 103 (and, thus, the event prediction rule) at block 240. At block 250, predicting an event 102 is based on the identified time lagged dependency (the event prediction rule) as well as information (block 210) regarding historical or real-time occurrences of factors 103. That is, according to one embodiment, the validation may be done on historically available data. In an alternate embodiment, the validation may be done using real-time data (i.e., applying the time lagged dependency to a newly occurring factor). Real-time validation may be more or less practical depending on the duration of the window period 101 (i.e., using real-time information for validation may be impractical when the window period 101 is relatively long). Based on validating the prediction at block 260, adding to information at block 270 includes adding to the knowledge base regarding correlated factors 103 and events 102.

According to an alternate embodiment, the information identifies two or more candidate factors 103 (or set of factors 103). The processes of determining the window period 101 at block 220 and collecting samples within the window period 101 at block 230 are done for all the candidate factors 103. Then the factor 103 of interest is identified at block 235. Once the factor 103 is identified at block 235, the processes of identifying the time lagged dependency (and corresponding event prediction rule) at block 240 and the subsequent processes (250-270) are the same as for the embodiment described above. Each of the processes is detailed below. Determination of the window period 101 (block 220) is detailed first.

Figure 3:
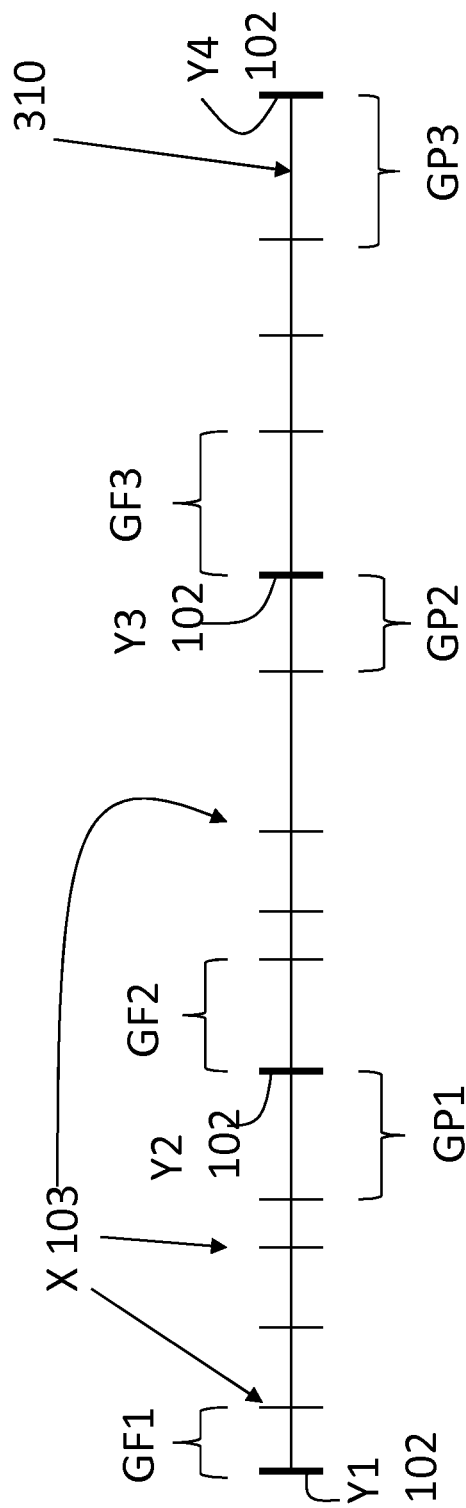
FIG. 3 illustrates an exemplary set of data used to identify a window period according to embodiments of the invention.

FIG. 3 illustrates an exemplary set of data used to identify a window period 101 according to embodiments of the invention. An exemplary timeline 310 is shown with times of occurrences of (historical) events 102 Y and factors 103 X. As noted, the factor 103 (e.g., car theft) for a given event 102 (e.g., residential burglary) may be a known factor 103. Alternately, more than one candidate factor 103 may be used on the timeline 310. That is, factor 103 X may be more than one type of factor (e.g., car theft, gun theft) that may potentially correlate with an event 102 Y of interest (e.g., residential burglary). Times of occurrence of a set of events 102 Y1, Y2, Y3, Y4 (e.g., times of four residential burglaries) are labeled on the timeline 310 in FIG. 3, and times of occurrence of the one or more factors 103 (e.g., times of eleven car thefts or times of seven car thefts and four gun thefts) are indicated by all the other marks interspersed between events 102 Y1 and Y4. The time gap between a given event 102 Y and the factor 103 X immediately following the event 102 is labeled as GF, and the time gap between a given event 102 Y and the factor 103 X immediately preceding the event 102 is labeled as GP. According to an alternate embodiment, in which the event 102 has a hard end, described further below, the time gap between a given event 102 Y and the hard end preceding a factor 103X and then the event 102 Y is GP. For a given set of events 102 Y {Y1, Y2, ..., Yi} and a given set of factors 103 X {X1, X2, ..., Xj}, the total number of GF and GP is i−1 (for a duration beginning and ending with an event Y). In the example shown in FIG. 3, i is 4, j is 11, and the total number of GF and GP is i−1 or 3, as shown. The values of a 104, b 105, c 106, and d 107, which are used to compute the window period 101, are based on the summary statistics of the i−1 values of GF and GP, assuming a normal distribution, as follows:

$$a = \frac{\sum_{i-1} GF}{i-1} \qquad [\text{EQ. 1}]$$

$$b + c = \frac{\sum_{i-1} GP}{i-1} \qquad [\text{EQ. 2}]$$

$$d = \frac{\sum_{i-1} Tyn - Tym}{i-1} \qquad [\text{EQ. 3}]$$

Tyn and Tym are the times of occurrence of two events, with Tyn being the later event. Each of the values of a 104, b 105, c 106, and d 107 may have a standard deviation added or subtracted. The standard deviation value may be determined based on prior knowledge. The determination of the window period using a 104, b 105, c 106, and d 107 is explained for two different embodiments with reference to FIGS. 4 and 5 below.

Figure 4:
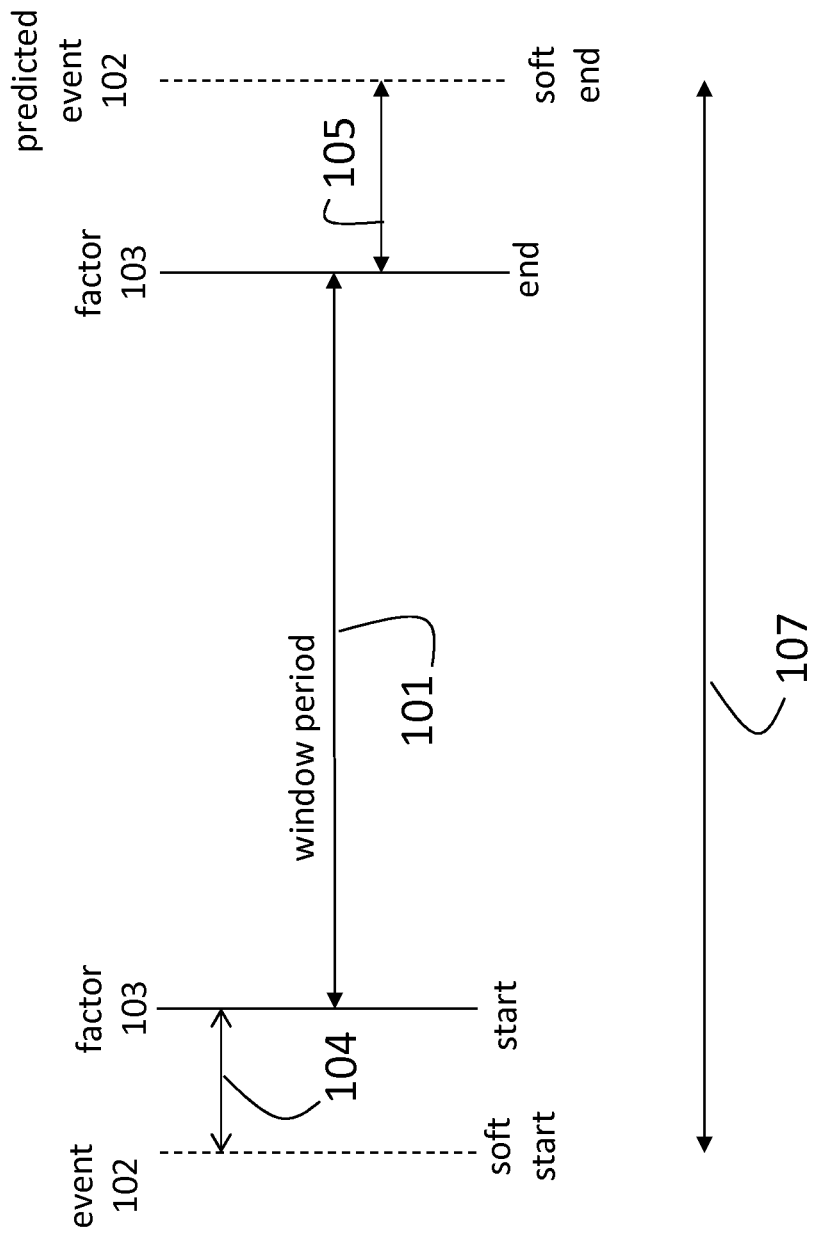
FIG. 4 illustrates a window period according to one embodiment of the invention.

FIG. 4 illustrates a window period 101 according to one embodiment of the invention. According to the embodiment shown in FIG. 2, there is no c 106 (no hard end, such that c=0), as further explained below. The total time period between events 102 (soft start to soft end) is given by d 107, as indicated by EQ. 3. As indicated by EQ. 1, the average interval or gap between an event 102 and a factor 103 immediately following (average GF) is given by a 104. The occurrence of the factor 103 starts the window period 101, which is the value to be computed. As indicated by EQ. 2, the average interval or gap between a factor 103 and the subsequent event 102 (average GP) is given by b 105. Because the values of a 104, b 105, and d 107 are computed (using EQ. 1, EQ. 2, EQ. 3, where EQ. 2 provides b 105 where there is no c 106 or c=0) using the available historical data, the window period 101 may be computed according to:

$$d-(a+b) \qquad [\text{EQ. 4}]$$

Figure 5:
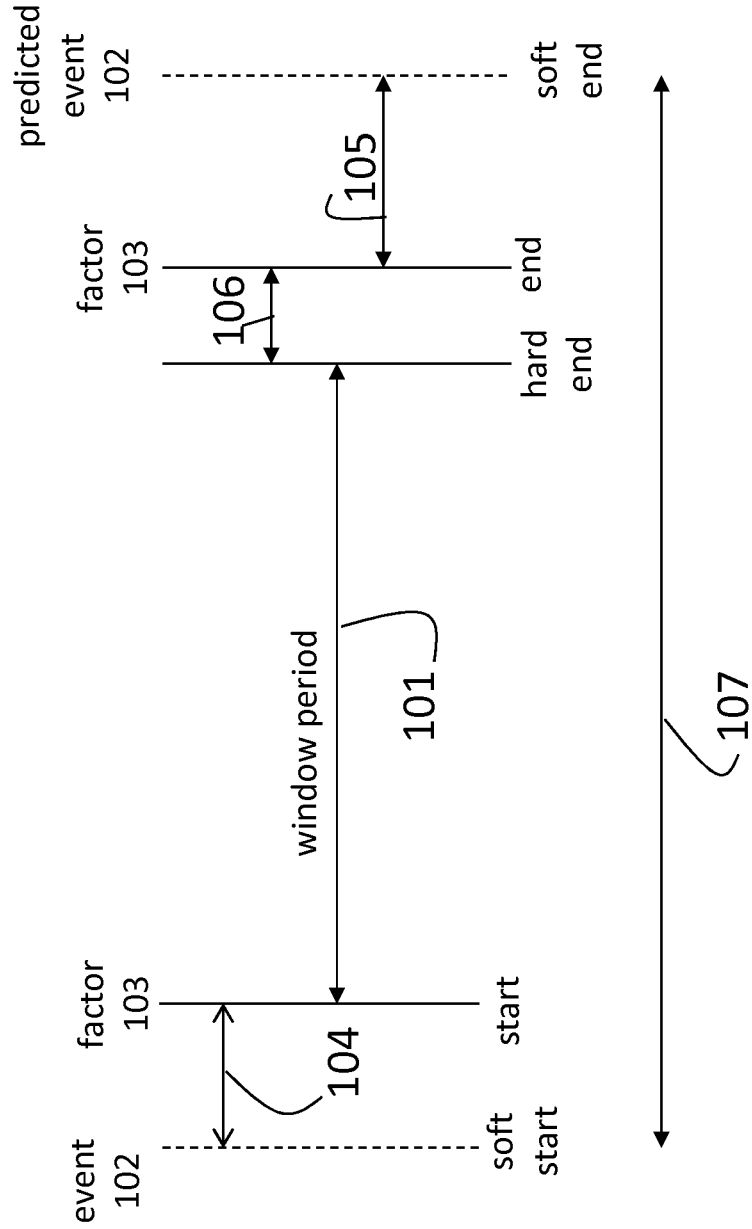
FIG. 5 illustrates a window period according to another embodiment of the invention.

FIG. 5 illustrates a window period 101 according to another embodiment of the invention. The embodiment shown in FIG. 5 includes a duration c 105, which represents a definitive closure (hard end) of an event 102. For example, when the event 102 to be predicted is the purchase of butter, the expiration date of the previously purchased butter would provide c 106. As indicated by the embodiment shown in FIG. 4, this definitive closure, which acts as an extension to the window period 101, may not apply for a particular event 102. As noted in the discussion related to FIG. 3, GP is b+c when the event 102 of interest does have a hard end. In this case, EQ. 2 does provide the sum of b 105 and c 106, and the window period 101 is given by:

$$d-(a+b+c) \qquad [\text{EQ. 5}]$$

Once the window period is known, samples of event 102 and factor 103 occurrences are collected (block 230, FIG. 2) from received information (block 210, FIG. 2) or in real time for analysis and determination of the time lagged dependency of the event 102 on the factor 103 (block 240, FIG. 2), as detailed below. According to one embodiment, a factor 103 is selected as the most closely correlated factor 103 from among candidate factors 103 prior to determination of the time lagged dependency at block 240. This embodiment is discussed first.

Figure 6:
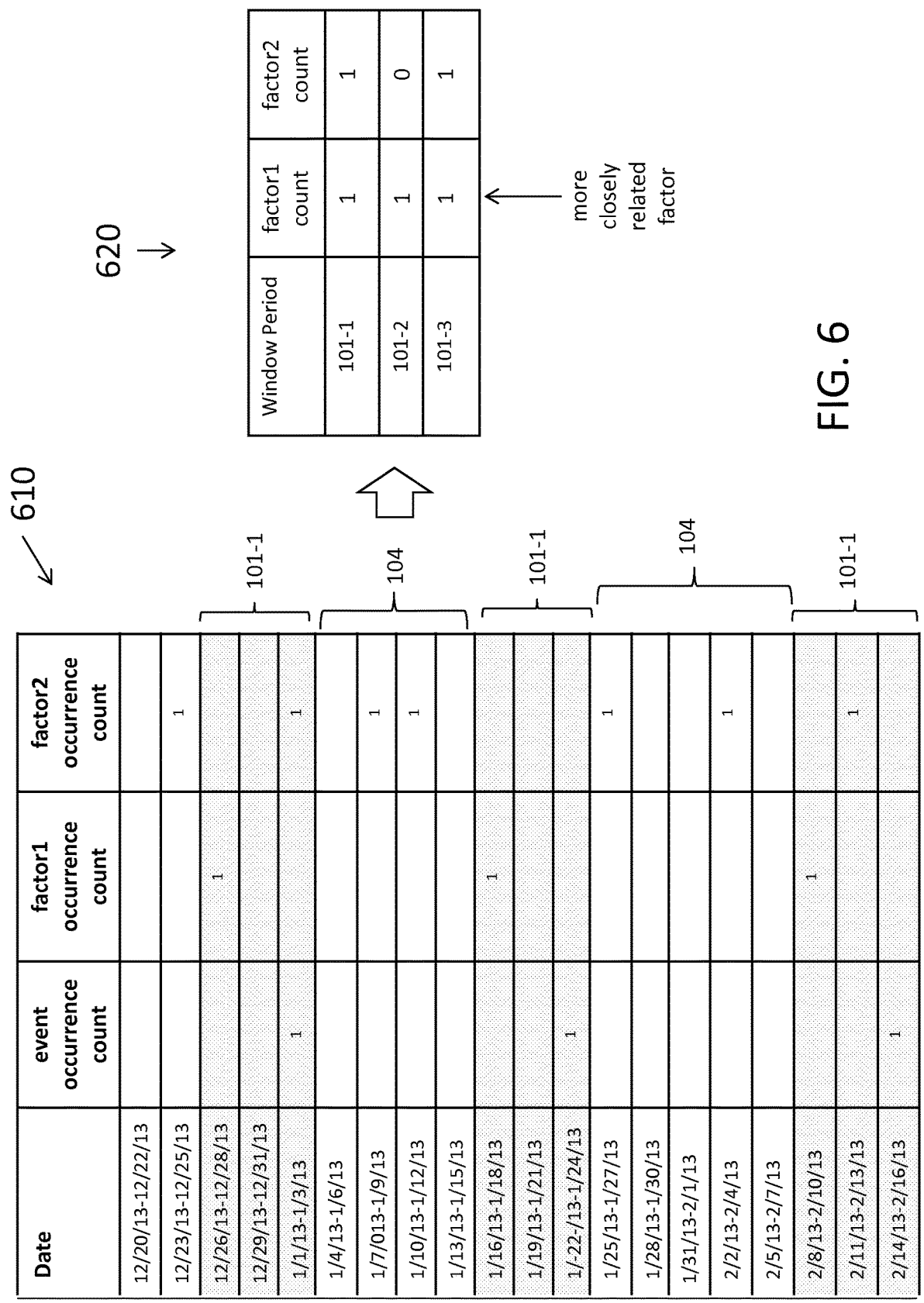
FIG. 6 depicts a sampling table used to identify a factor among two exemplary candidate factors according to an embodiment of the invention.

FIG. 6 depicts a sampling table 610 used to identify a factor 103 among two exemplary candidate factors 103 according to an embodiment of the invention. FIG. 6 illustrates the processing at block 235 according to the embodiment in which more than one (potential) factor 103 is identified in the information received from the sources 130. While two candidate factors 103 (factor1 and factor 2) are shown in FIG. 6 for explanatory purposes, additional candidate factors 103 may be considered (in the determination of the window period 101 at block 220 and in the processing at block 235 to identify the candidate factor 103 that most closely correlates with the event 102 of interest). The sampling table 610 includes the number of occurrences of the event 102 of interest and the candidate factors 103 factor1 and factor2 over three window periods 101-1, 101-2, 101-3. The times between window periods 101 are intervals a 104. The number of occurrences of the candidate factors 103 factor1 and factor 2 are summed in summation table 620. The summation table 620 indicates that the first candidate factor 103 factor1 occurred more times in the window periods 101 in which samples were taken than the second candidate factor 103 factor2. Based on this, the first candidate factor 103 factor1 is identified as the factor 103 to be used in the prediction of the event 102 because it is more closely related to the event 102. At this stage of the process flow shown in FIG. 2 (after block 235 is completed), the window 101 period has been identified and a single factor 103 has also been identified (whether the factor 103 was known from the start or determined at block 235). The identification of time lagged dependency of the event 102 on the factor 103 (block 240) is detailed next.

Figure 7:
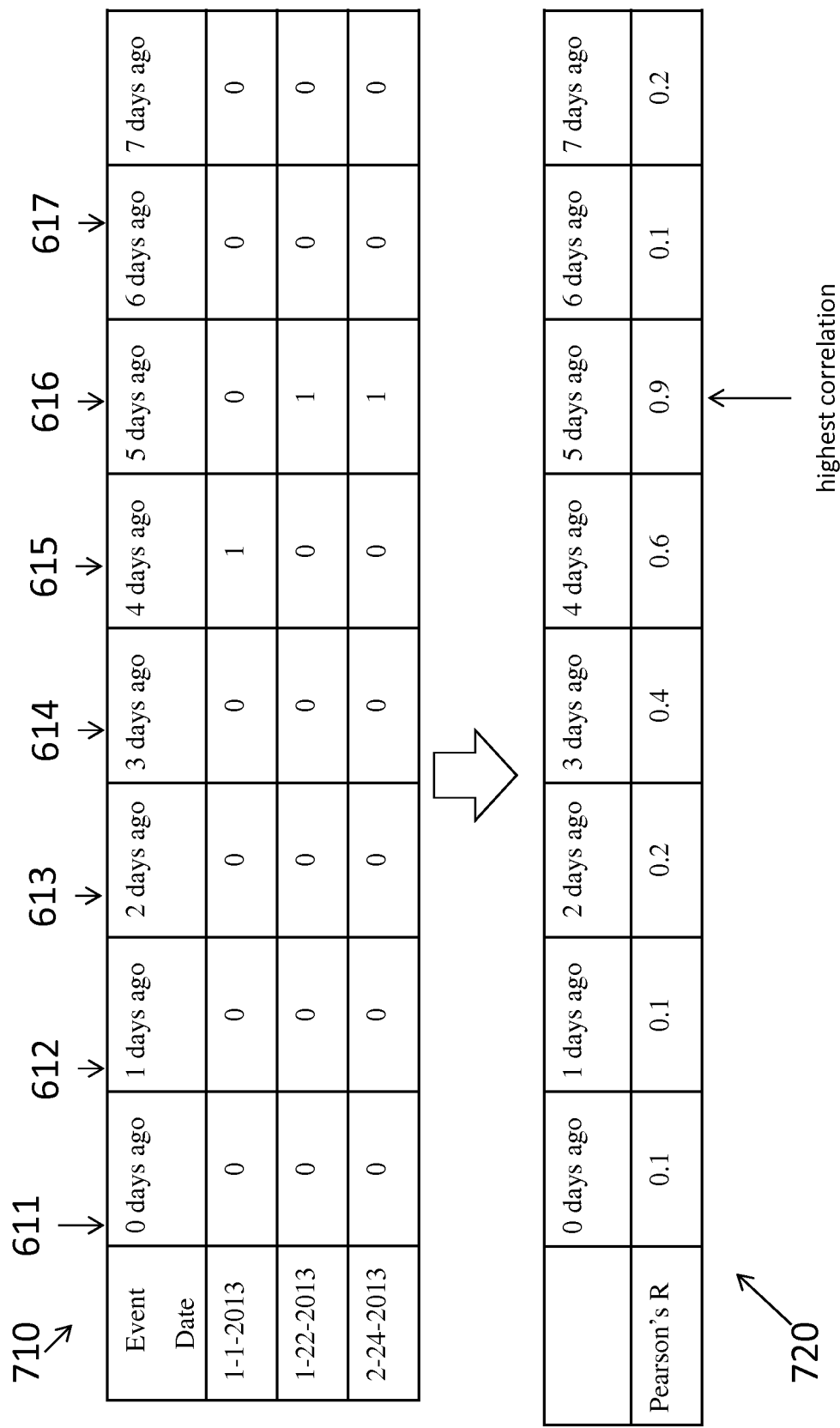
FIG. 7 depicts a sampling table used to identify a time lagged dependency according to an embodiment of the invention.

FIG. 7 depicts a sampling table 710 used to identify a time lagged dependency according to an embodiment of the invention. When a single factor 103 is known to be correlated with the event 102 of interest, the sampling table 610 and summation table 620 shown in FIG. 6 are not generated. However, the samples collected in sampling table 610 may be used to determine the time lagged dependency. For explanatory purposes, sampling table 710 and correlation table 720, associated with one factor 103 of interest (e.g., factor 103 factor1 identified according to the discussion with reference to FIG. 6), are discussed rather than sampling table 610 and the correlation table that would correspond with the sampling table 610 and factor 103 factor1. In the example illustrated in FIG. 7, a window period 101 of 7 days is assumed. Thus, for each event date indicated in the sampling table 710, factor 103 occurrences (indicated by "1") on the day of the event 102 and for each day up to seven days prior are shown. Based on the factor 103 occurrences indicated in the sampling table 710, a correlation table 720 is generated, indicating a correlation between the factor 103 and the event 102 on each day of the seven-day window period 101 in the example. The correlation may be quantified using, for example, Pearson's R correlation, as shown in FIG. 7. In alternate embodiments, another type of correlation (e.g, Cramer's V correlation) may be used. The highest correlation among the correlations indicated in the correlation table 720 for the window period 101 are used to determine the time lagged dependency. In the exemplary case, because "5 days ago" within the window period 101 of seven days indicates the highest correlation value, the time lagged dependency is determined to be five days. Based on the time lagged indicator (factor 103 occurrence), the event prediction is given by:

$$\text{factor\_occurrence}+a+\text{time\_lag} \qquad [\text{EQ. 6}]$$

From the time of occurrence of the factor 103, the duration a 104 and the time lag, discussed with reference to the correlation table 720 above, indicate the predicted occurrence of the event 102. For the example discussed above, five days prior to the event 102 resulted in the highest correlation between the factor 103 and the event 102. Thus, time_lag in EQ. 6 would be 5 in the exemplary case. The value of a 104 would have been determined using EQ. 1 during the process of determining the window period 101 (block 220, FIG. 2).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of identifying a time lagged indicator of an event to be predicted, the method comprising:
   receiving information including an indication of a factor, the factor being a different event than the event to be predicted;
   identifying, using a processor, a window period within which the event is statistically correlated with the factor, wherein the window period is a duration of time;
   obtaining, using the processor, data for the duration of the window period prior to one or more occurrences of the event, the data indicating a number of occurrences of the factor at each sub-period within the window period, wherein the sub-periods within the duration of the window period are of a same time length and each sub-period corresponds with a respective multiple of the time length prior to the occurrence of the respective one or more events;
   calculating, using the processor, a correlation value between the event and the factor for each sub-period within the window period using a sum of the number of occurrences of the factor during the sub-period prior to each of the one or more occurrences of the event;
   determining, using the processor, a highest correlation value among the correlation values calculated for the sub-periods within the window period;
   identifying, using the processor, a selected sub-period among the sub-periods within the window period prior to the occurrence of each of the one or more events for which the correlation value is the highest correlation value;
   identifying, using the processor, a time lagged dependency of the event on the factor as the respective multiple of the time length prior to the occurrence of the one or more events that corresponds with the selected sub-period; and
   providing, with the processor, a prediction of an occurrence of the event as being the respective multiple of the time length identified as the time lagged dependency following an occurrence of the factor.

2. The method according to claim 1, wherein the identifying the window period includes analyzing historical information including times of occurrences of the event and times of occurrences of the factor for a time period between a first time of occurrence of the event and a last time of occurrence of the event among the times of occurrences of the event.

3. The method according to claim 2, wherein the analyzing the historical information includes computing a first average duration based on a duration between the times of occurrences of the event, except the first time of occurrence of the event, and the respective time of occurrence of the factor immediately preceding the respective time of occurrence of the event and also computing a second average duration based on a duration between the times of occurrences of the event, except the last time of occurrence of the event, and the respective time of occurrence of the factor immediately following the respective time of occurrence of the event.

4. The method according to claim 3, wherein the identifying the window period includes computing the window period based on the duration between the first time of occurrence of the event and the last time of occurrence of the event, the first average duration, and the second average duration.

5. The method according to claim 3, wherein the computing the first average duration is additionally based on a definitive closure time of the event preceding the respective event.

6. The method according to claim 1, further comprising generating summation data based on summing a number of occurrences of the factor over the window period prior to each event in the data and summing a number of occurrences of a second factor over the window period prior to each event in the data.

7. The method according to claim 6, further comprising identifying that the factor, instead of the second factor, should be used to predict the event, based on the summation data.

8. A system to identify a time lagged indicator of an event to be predicted, the system comprising:
   an input interface configured to receive information including an indication of a factor, the factor being a different event than the event to be predicted; and
   a processor configured to identify a window period within which the event is statistically correlated with the factor, wherein the window period is a duration of time, to obtain data for a duration of the window period prior to one or more occurrences of the event, the data indicating a number of occurrences of the factor at each sub-period within the window period, wherein the sub-periods within the duration of the window period are of a same time length and each sub-period corresponds with a respective multiple of the time length prior to the occurrence of the respective one or more events, to calculate a correlation value between the event and the factor for each sub-period within the window period using a sum of the number of occurrences of the factor during the sub-period prior to each of the one or more occurrences of the event, to determine a highest correlation value among the correlation values calculated for the sub-periods within the window period, to identify a selected sub-period among the sub-periods within the window period prior to the occurrence of each of the one or more events for which the correlation value is the highest correlation value, to identify a time lagged dependency of the event on the factor as the respective multiple of the time length prior to the occurrence of the one or more events that corresponds with the selected sub-period, and to provide a prediction of an occurrence of the event as being the respective multiple of the time length identified as the time lagged dependency following an occurrence of the factor.

9. The system according to claim 8, wherein the processor identifies the window period based on an analysis of historical information including times of occurrences of the event and times of occurrences of the factor for a time period between a first time of occurrence of the event and a last time of occurrence of the event among the times of occurrences of the event.

10. The system according to claim 9, wherein the processor computes a first average duration based on a duration between the times of occurrences of the event, except the first time of occurrence of the event, and the respective time of occurrence of the factor immediately preceding the respective time of occurrence of the event and also computes a second average duration based on a duration between the times of occurrences of the event, except the last time of occurrence of the event, and the respective time of occurrence of the factor immediately following the respective time of occurrence of the event.

11. The system according to claim 10, wherein the processor computes the window period based on the duration between the first time of occurrence of the event and the last time of occurrence of the event, the first average duration, and the second average duration.

12. The system according to claim 8, wherein the processor generates summation data based on summing a number of occurrences of the factor over the window period prior to each event in the data and summing a number of occurrences of a second factor over the window period prior to each event in the data.

13. The system according to claim 12, wherein the processor identifies that the factor, instead of the second factor, should be used to predict the event, based on the summation data.

14. A non-transitory computer program product comprising instructions that, when processed by a processor, cause the processor to implement a method of identifying a time lagged indicator of an event to be predicted, the method comprising:
receiving information including an indication of a factor, the factor being a different event than the event to be predicted;
identifying a window period within which the event is statistically correlated with the factor, wherein the window period is a duration of time;
obtaining data for the duration of the window period prior to one or more occurrences of the event, the data indicating a number of occurrences of the factor at each sub-period within the window period, wherein the sub-periods within the duration of the window period are of a same time length and each sub-period corresponds with a respective multiple of the time length prior to the occurrence of the respective one or more events;
calculating a correlation value between the event and the factor for each sub-period within the window period using a sum of the number of occurrences of the factor during the sub-period prior to each of the one or more occurrences of the event;
determining a highest correlation value among the correlation values calculated for the sub-periods within the window period; identifying a selected sub-period among the sub-periods within the window period prior to the occurrence of each of the one or more events for which the correlation value is the highest correlation value;
identifying a time lagged dependency of the event on the factor as the respective multiple of the time length prior to the occurrence of the one or more events that corresponds with the selected sub-period; and
providing a prediction of an occurrence of the event as being the respective multiple of the time length identified as the time lagged dependency following an occurrence of the factor.

15. The non-transitory computer program product according to claim 14, wherein the identifying the window period includes analyzing historical information including times of occurrences of the event and times of occurrences of the factor for a time period between a first time of occurrence of the event and a last time of occurrence of the event among the times of occurrences of the event.

16. The non-transitory computer program product according to claim 15, wherein the analyzing the historical information includes computing a first average duration based on a duration between the times of occurrences of the event, except the first time of occurrence of the event, and the respective time of occurrence of the factor immediately preceding the respective time of occurrence of the event and also computing a second average duration based on a duration between the times of occurrences of the event, except the last time of occurrence of the event, and the respective time of occurrence of the factor immediately following the respective time of occurrence of the event.

17. The non-transitory computer program product according to claim 16, wherein the identifying the window period includes computing the window period based on the duration between the first time of occurrence of the event and the last time of occurrence of the event, the first average duration, and the second average duration.

18. The non-transitory computer program product according to claim 14, further comprising generating summation data based on summing a number of occurrences of the factor over the window period prior to each event in the data and summing a number of occurrences of a second factor over the window period prior to each event in the data and identifying that the factor, instead of the second factor, should be used to predict the event, based on the summation data.

* * * * *